Figure 1:
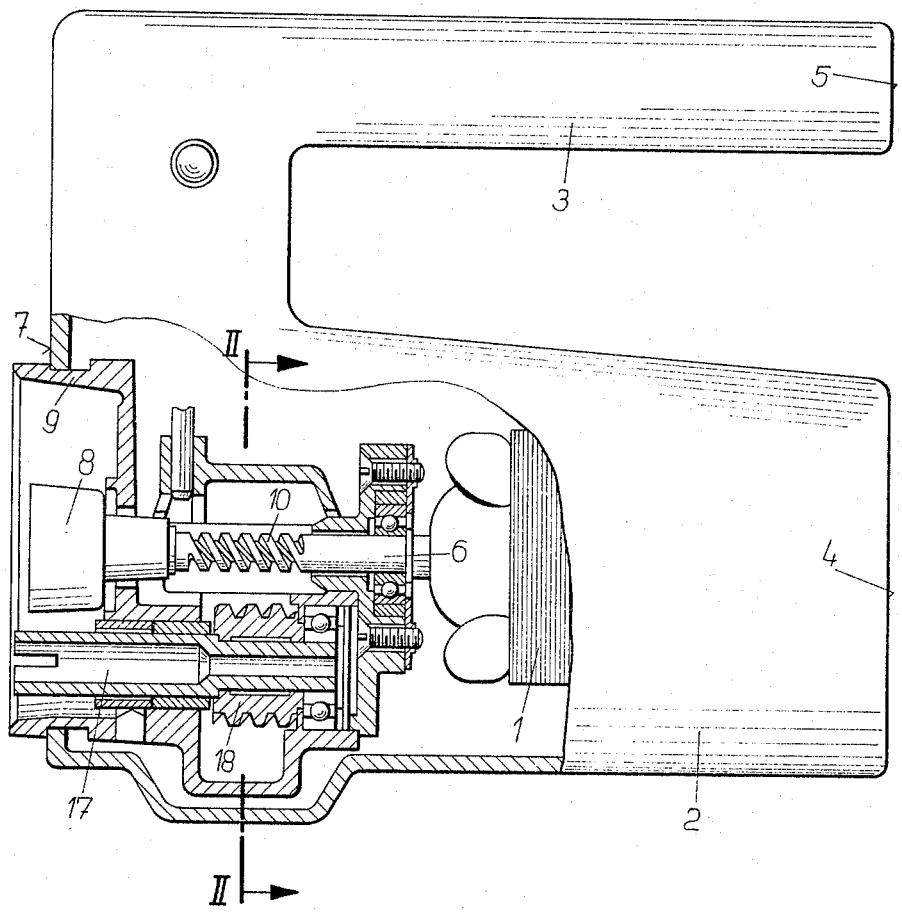

Oct. 18, 1966   A. BRAUN ETAL   3,279,265
DRIVING DEVICE FOR KITCHEN UTENSILS AND TOOLS
Filed Nov. 3, 1964   2 Sheets-Sheet 2

Inventor
ARTUR BRAUN
GUNTER VOIGT

United States Patent Office 3,279,265
Patented Oct. 18, 1966

3,279,265
DRIVING DEVICE FOR KITCHEN UTENSILS AND TOOLS
Artur Braun and Gunter Voigt, Frankfurt, Germany, assignors to Braun Aktiengesellschaft, Frankfurt, Germany
Filed Nov. 3, 1964, Ser. No. 408,606
Claims priority, application Germany, Nov. 9, 1963, B 55,267
2 Claims. (Cl. 74—16)

The invention relates to a driving device which comprises an electric motor and is arranged for operation either hand-held or standing independently, which device has a plurality of drive shafts revolving at various speeds, to which kitchen implements and kitchen utensils may be connected as required.

Known devices of this nature, which in principle constitute a further development of the usual electric whisk having a bow-shaped handle and employed only in handheld operation, possess at least one but uslally two medium-speed drive shafts extending perpendicularly to the motor shaft and driven by means of gearing, such as a worm gear for example, which shafts are accessible through apertures in the side of the casing of the device opposite to the handle. To these driven shafts can be connected such kitchen implements as stirrers, kneaders or the like, which may be operated hand-held in a bowl.

To drive cutting and liquidising implements which operate at high speeds, for example beaters, devices known hitherto have been fitted with a further drive shaft running at the speed of the motor and usually, in order to simplify construction, formed directly as an extension of the motor shaft.

In order to allow also independent standing operation of kitchen utensils incorporating beating implements, for example mixers or coffee mills, this shaft is arranged to extend, at the end of the device opposite to the supporting surface thereof, centrally in a socket which is fast with the casing and into which the stationary containers of these high speed kitchen utensils are inserted.

Driving devices of this kind are, however, employed not only for high-speed mixers and coffee mills but, in order to extend the range of operation, also for low-speed kitchen utensils, for example mincers and lemon squeezers or other juice extractors which operate while standing independently and which are connected to the medium-speed drive shaft. However, for various reasons this manner of connecting gives rise to difficulty.

Since in independent standing operation the medium-speed drive shafts are horizontal, so that generally no socket is available, the kitchen utensils that may be attached have to be fitted with an additional support or, if this is undesirable, the side of the casing of the device at which the handle is attached has to be provided with an additional supporting surface; this feature can only be realized with difficulty as the handle cannot be given the width that may be desired.

Finally, in aiming for facility in handling the device, it is unrealistic to arrange for both kitchen utensils and kitchen tools to be attachable to one drive shaft, when only kitchen utensils are attachable to the other.

Furthermore, in most cases the medium-speed drive shafts will still be too fast to ensure effective operation when mincing or when extracting juice.

The present invention seeks to remove the above-mentioned difficulties by arranging close to the high-speed drive shaft, and parallel thereto, a further drive shaft which extends into the socket and which is driven by one of the medium-speed drive shafts at a still lower speed, by means of gearing.

The form of driving device provided by the invention has the advantage that all the kitchen utensils which operate in independent standing operation are connected only to the side of the casing which is provided with the socket and all the tools which work in hand-held operation are connected only on the side opposite to the handle, so that the possibility of confusion is excluded. Besides this, the invention offers the possibility of making connections to allow operation at three different speeds of rotation, so that all the jobs which occur may be satisfactorily dealt with at whatever speed is appropriate. An important feature is the small additional constructional requirement; this entails no enlargement of the external dimensions of the device, such as might detract from easy handling during hand-held operation.

The gearing may be conveniently arranged in such a way that the medium-speed drive shaft bears a worm with which a worm gear attached to the low-speed drive shaft engages.

Figure 2:
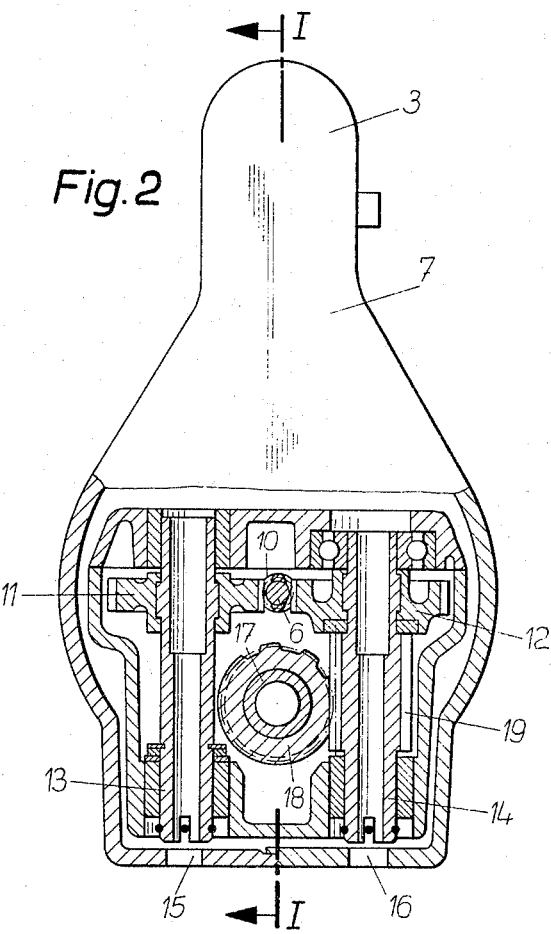

The accompanying drawing shows, by way of example only, one embodiment of the invention and in the drawing:

FIG. 1 is a side view of a driving device comprising an electric motor, the device being partially sectioned along the median plane 1—1 in FIG. 2; and FIG. 2 is an end view of the device, partially in section along the line 2—2 in FIG. 1.

The driving device has an electric motor 1 surrounded by a substantially cylindrical casing 2 to which a handle 3 is attached to extend longitudinally at one side. One end face 4 of the casing is formed to be plane and serves as a supporting surface on which the device can rest upon a table or on which it can be put down, the adjacent end face 5 of the handle also forming a part of this supporting surface. The device can thus be used either held in the hand or standing independently.

The motor shaft 6 is extended as far as the end face 7 of the casing which is opposite the supporting surface and at its end it bears clutch unit 8 to which high-speed kitchen implements such as beaters can be attached. The motor shaft therefore serves directly as a high-speed drive shaft. To actuate kitchen utensils in which such tools revolve in a fixed bowl, e.g., mixers and coffee mills, a conical socket 9 concentrically surrounding the clutch unit 8 is provided, inset in the end face of the casing. When such a kitchen utensil is to be employed, the driving device is set up on its supporting surface 4 in such a manner that the motor shaft is vertical and the kitchen utensil, which has a corresponding external cone, is inserted into the socket, the driven member of the revolving implement automatically engaging with the clutch unit 8 in the known manner.

On the shaft 6, in front of the clutch unit 8, there is fixed a worm 10 with which two worm gears 11 and 12 (FIG. 2) engage on opposite sides thereof, and these are mounted on two driven shafts 13 and 14 which revolve in opposite directions. These driven shafts, which extend perpendicularly to the motor shaft 6, are accessible through two apertures 15 and 16 located on the side of the casing opposite the handle 3 and serve primarily for driving hand-held kitchen implements which operate at medium speeds, e.g., stirrers and kneaders.

Close to the high-speed drive shaft 6 (i.e., the motor shaft) and parallel thereto is arranged a further driven shaft 17 the outer end of which, likewise projects into the socket 9 but which extends eccentrically in the latter and has at its inner end a worm gear 18, which meshes with a worm 19 attached to a medium-speed driven shaft 14. Thus the shaft 17 revolves at still lower speed. The low-speed driven shaft 17 serves principally for actuating kitchen utensils which revolve at a slow rate but which demand a high torque, e.g., lemon squeezers and other juice extractors and mincers; these are inserted into the socket 9 in the same manner as described above for mixers or coffee mills.

The driving device used in both hand-held and independent standing operation affords the possibility of actuating kitchen implements and utensils at three different speeds and, moreover, it may be handled very readily as all the high and low speed kitchen utensils, which are adapted for operation when standing independently, are attached on one side only of the casing, namely that provided with the socket, while stirring and kneading implements, which in the main operate at medium speed and can be used only handheld, are attached to the side opposite the handle.

What we claim is:

1. A driving device for kitchen utensils and tools arranged to be hand-held or to be self-standing on a support surface, said device comprising, in combination, a relatively elongated casing having a side wall and a pair of end walls; a handle extending laterally in one direction from said side wall, adjacent one end wall of said casing, and then in spaced substantially parallel relation to said side wall, the end of said handle being coplanar with the other casing end wall to act conjointly with the latter in supporting said device in self-standing relation on a support surface; a cup-shaped outwardly opening socket in said one end wall to receive and support kitchen utensils when said device is self-standing; a motor in said casing near the other end wall and having a high speed drive shaft extending substantially centrally into said socket for coupling to a high speed kitchen utensil supported in said socket; at least one medium speed shaft extending laterally to an opening through said side wall in a direction opposite to said one direction, for coupling to a medium speed kitchen utensil or tool, said medium speed shaft being offset relative to said high speed drive shaft with its axial direction being at an angle of substantially 90° to the axial direction of said high speed drive shaft; first reduction gearing interconnecting said high speed drive shaft and said medium speed shaft; a low speed shaft extending, in closely adjacent substantially parallel relation to said high speed drive shaft, into said socket for coupling to a low speed kitchen utensil; and second reduction gearing interconnecting said medium speed shaft, and said low speed shaft.

2. A driving device for kitchen utensils and tools, as claimed in claim 1, in which said second reduction gearing comprises a worm on said medium speed shaft engaged with a worm gear on said low speed shaft.

References Cited by the Examiner

UNITED STATES PATENTS

| | | | |
|---|---|---|---|
| 2,187,272 | 1/1940 | Kochner | 74—16 X |
| 2,502,239 | 3/1950 | Wallach | 74—16 |
| 2,707,623 | 5/1955 | Schwaneke. | |
| 2,727,395 | 12/1955 | White | 74—16 |

FOREIGN PATENTS

| | | |
|---|---|---|
| 957,475 | 5/1964 | Great Britain. |

MILTON KAUFMAN, *Primary Examiner.*